United States Patent [19]

Ogawa et al.

[11] Patent Number: 5,005,020
[45] Date of Patent: Apr. 2, 1991

[54] TRANSPARENT GLASS ANTENNA FOR AN AUTOMOBILE

[75] Inventors: Masanobu Ogawa; Shinya Shibata, both of Aikawa, Japan

[73] Assignee: Asahi Glass Company, Ltd., Tokyo, Japan

[21] Appl. No.: 542,659

[22] Filed: Jun. 25, 1990

Related U.S. Application Data

[63] Continuation of Ser. No. 145,102, Jan. 19, 1988, abandoned.

[30] Foreign Application Priority Data

Jan. 20, 1987 [JP] Japan ................. 62-5508[U]
May 18, 1987 [JP] Japan ................. 62-72860[U]

[51] Int. Cl.⁵ .................................................. H01Q 1/32
[52] U.S. Cl. ................................................. 343/713
[58] Field of Search ......................... 343/704, 711–713

[56] References Cited

U.S. PATENT DOCUMENTS

| | | | |
|---|---|---|---|
| 3,208,070 | 9/1965 | Boicey | 343/712 |
| 3,845,489 | 10/1974 | Sauer et al. | 343/713 |
| 3,928,748 | 12/1975 | Sauer | 343/704 |
| 4,329,691 | 5/1982 | Prewitt | 343/713 |
| 4,757,322 | 7/1988 | Yokogawa et al. | 343/713 |

FOREIGN PATENT DOCUMENTS

| | | | |
|---|---|---|---|
| 730131 | 1/1943 | Fed. Rep. of Germany | 343/713 |
| 2405561 | 6/1979 | France | 343/713 |
| 49-1562 | 1/1974 | Japan | 343/713 |
| 61-15403 | 1/1986 | Japan | 343/713 |
| 244101 | 10/1986 | Japan . | |

*Primary Examiner*—Michael C. Wimer
*Attorney, Agent, or Firm*—Oblon, Spivak, McClelland, Maier & Neustadt

[57] ABSTRACT

A transparent glass antenna for an automobile comprises a window glass panel, a transparent conductive film formed in the window glass panel excluding its peripheral portion where a blank region having a predetermined width is formed, a bus bar formed at the peripheral portion of the transparent conductive film so as to surround the substantially entire peripheral portion of the film, and a current feeding terminal formed at a predetermined position in the bus bar.

3 Claims, 4 Drawing Sheets

TRANSPARENT GLASS ANTENNA FOR AN AUTOMOBILE

This application is a continuation of application Ser. No. 145,102, filed on Jan. 19, 1988, now abandoned.

BACKGROUND OF THE INVENTION

1. Field of the Invention

The present invention relates to a transparent glass antenna for an automobile. More particularly, it relates to such antenna using a transparent conductive film as an antenna conductor.

2. Discussion of Background

As a glass antenna for an automobile formed by arranging an antenna conductor in or on a glass panel which constitutes a window glass in the automobile, there have been known one which is formed by printing a conductive paste such as a silver paste in a predetermined pattern followed by baking it; one formed by arranging a fine metallic line having electric conductivity in a predetermined linear pattern; or one constituted by a transparent conductive film covering on the glass panel in a film form.

Of these glass antennas, the glass antenna having the transparent conductive film as an antenna conductor is considered to be preferred for the reason that it does not obstruct the visual field of a driver and it does not disturb the driver unlike a conventional linear antenna conductor. However, it is not always easy to obtain a sufficient sensitivity by the film-shaped antenna conductor. Therefore, trial and error has been repeated to develop a film glass antenna with an excellent pattern in gain.

The inventors of the present application have developed a transparent glass antenna having a conductor pattern providing a relatively excellent gain as shown in FIG. 10. In FIG. 10, a transparent conductive film 23 divided into three regions by slits 22 is arranged at the upper side of a glass panel 21 in which a bus bar 25 is disposed at the upper edge of the central portion of the transparent conductive film 23. A reference numeral 26 designates an antenna feeder line.

Further effort to attempt improvement in the performance of such film antenna conductor as the transparent conductive film has revealed that it is more efficient to arrange the bus bar 25 so as to surround the peripheral portion of the transparent conductive film 23 rather than that the bus bar 25 is arranged at only one side edge of the transparent conductive film 23. However, when the bus bar 25 is arranged at the edge portion of the transparent conductive film 23 partially covering the glass panel 21, the arrangement of the bus bar 25 may constitute an obstacle to the visual field of the driver, and it is undesirable as a glass antenna for an automobile.

Further, formation of the slits 22 to divide the transparent conductive film 23 into a plurality of sections on the glass panel 21 is troublesome because it is difficult to form the slits 22 with a predetermined width according to a designed value. In addition, the position for connecting the antenna feeder line 26 is restricted to be at the upper side portion of the glass panel 21 as shown in FIG. 10, for instance, in view of the arrangement of the bus bar 25. Thus, there has been many restrictions in the arrangement of the bus bar 25 and the antenna feeder line 26. The presence of the slits may disturb a driver and a passenger even though the transparent conductive film 23 is transparent.

SUMMARY OF THE INVENTION

It is an object of the present invention to eliminate the above-mentioned problem found in the transparent glass antenna using a film antenna conductor for an automobile, and to provide a transparent glass antenna for an automobile which provides excellent sensitivity as an antenna; does not obstruct the visual field of a driver; is easy to manufacture the glass antenna, and imparts some degree of freedom to connect a lead wire.

The foregoing and the other objects of the present invention have been attained by providing a transparent glass antenna for an automobile which comprises a window glass panel, a transparent conductive film formed in the window glass panel excluding its peripheral portion where a blank region having a predetermined width is formed, a bus bar formed at the peripheral portion of the transparent conductive film so as to surround the substantially entire peripheral portion of the film, and a current feeding terminal formed at a predetermined position in the bus bar.

BRIEF DESCRIPTION OF THE DRAWINGS:

A more complete appreciation of the invention and many of the attendant advantages thereof will be readily obtained as the same becomes better understood by reference to the following detailed description when considered in connection with the accompanying drawings, wherein.

DETAILED DESCRIPTION OF PREFERRED EMBODIMENTS

Figure 1:
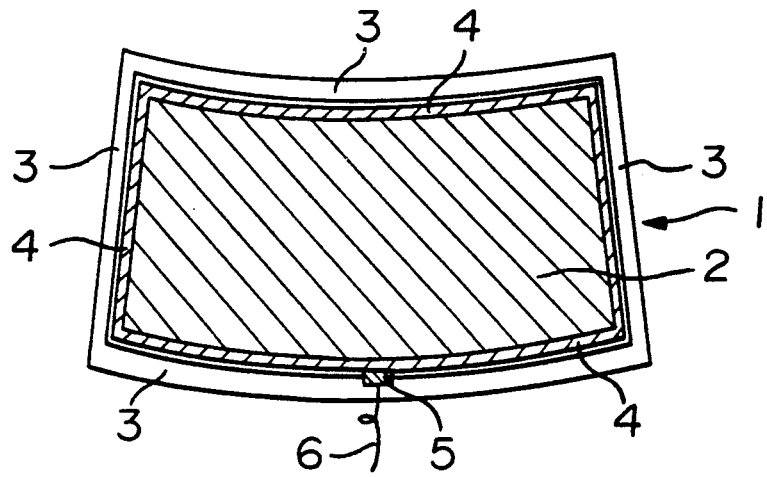
FIG. 1 is a front view of an embodiment of the glass antenna according to the present invention.

Referring to the drawings, wherein the same reference numerals designate the same or corresponding parts throughout the several views, and more particularly to FIGS. 1-6, there is shown front views of the several embodiments of the glass antenna of the present invention. In FIGS. 1-6, a reference numeral 1 designates a window glass panel, 2 designates a transparent conductive film, a numeral 3 designates a blank region of the transparent conductive film formed around the window glass panel, a numeral 4 designates a bus bar formed at the peripheral portion of the transparent conductive film, a numeral 5 designates a current feeding terminal, and a numeral 6 designates an antenna feeder line connected to the current feeding terminal 5.

In the present invention, the transparent conductive film 2 functioning as a film antenna conductor may be formed on or in a window glass panel 1 except its entire peripheral portion in which a blank region 3 having a predetermined width is formed as an insulating region. In the embodiment shown in the Figures, the transparent conductive film 2 is provided at the bonding surface between a glass plate in laminated glass plates and an interlayer film which is interposed between the laminated glass plates, or in the interlayer film, or on the surface of a strengthened single-plate glass facing the interior of an automobile. The window glass panel 1 is used for the front glass, the rear glass, the side glass or the roof glass of the automobile.

For the width of the blank region 3 formed at the peripheral portion of the window glass panel 1, it is necessary for the blank region 3 to have the width to avoid current conduction of a high frequency waves by the contact of the transparent conductive film 2 formed in the window glass 1 to a portion of the car body such as a window frame, and to provide a high performance of sensitivity as an antenna. For this purpose, it is preferable that the blank region has a stripe-like region in width of at least 10 mm, preferably 15 mm. The upper limit of the distance depends on a condition how the glass antenna of the present invention is fitted to the window of the automobile. Generally, it is so determined that the border line of the transparent conductive film does not disturb the passenger. Therefore, it is desirable to determine the distance to be 100 mm or lower at the upper side and the both sides, and to be 200 mm or lower at the lower side.

For the transparent conductive film 2 formed in the window glass panel 1 excluding the blank region 3, a transparent conductive film of a thin single-layer film made of tin oxide, indium oxide, Cr, Ti, Ag, Au, Al, Cu, Ni may be used. Further, a thin multi-layer type transparent conductive film which is formed, for instance, sandwiching said thin film by a thin film of $ZnO$, $SnO_2$, $In_2O_3$, $TiO_2$, $Bi_2O_3$, $WO_3$, $ZnS$ and so on, e.g. a three-layer type such as $TiO_2/Ag/TiO_2$, $ZnO/Ag/ZnO$, $SnO_2/Ag/SnO_2$ may be used. In the above-mentioned embodiment, the transparent conductive film 2 having infrared reflecting properties is used. However, a transparent conductive film having relatively low infrared reflecting properties may be used, if necessary. When the transparent conductive film 2 is formed by using a material rich in infrared reflecting properties, it is suitably used for a window glass having good heat insulation properties which functions to reduce a room-cooling/warming load.

The transparent conductive film of the present invention should receive coming radio waves to thereby produce a desired induced voltage. For this purpose, it should have a surface resistance ranging from $4\Omega/\square$ to $500\Omega/\square$, especially $4\Omega\square$ to $20\Omega/\square$.

The transparent conductive film 2 having the above-mentioned construction may be formed by a suitable film-forming method such as a vacuum deposition process, a spattering process, a CVD process, a spraying process, a CLD process, a printing process and so on. In this case, the transparent conductive film 2 is preferably coated directly on the glass panel 1. Or, when the transparent conductive film is interposed on the bonding surface of a laminated glass, a transparent conductive plastic film which is formed by laminating previously a transparent conductive layer on a plastic film such as a polyester film may be interposed as the transparent conductive film 2 between the glass plates of the laminated glass. As a desirable embodiment of the transparent glass antenna for an automobile of the present invention, the transparent conductive film is formed as an antenna conductor on the inner face of the glass plate which constitutes the outer glass plate of the laminated glass between which an interlayer film is provided. With such construction, the transparent conductive film is not exposed outside to thereby avoid reduction in the durability of the antenna conductor in addition that reduction in sensitivity to receive radio waves through the antenna is minimized by arranging the transparent conductive film on the side of the outer glass plate.

Figure 2:
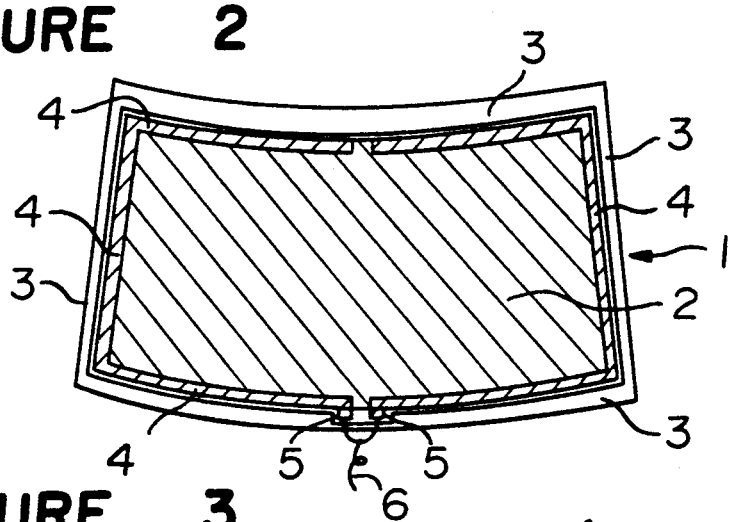
FIG. 2 is a second embodiment of the glass antenna of the present invention.
Figure 3:
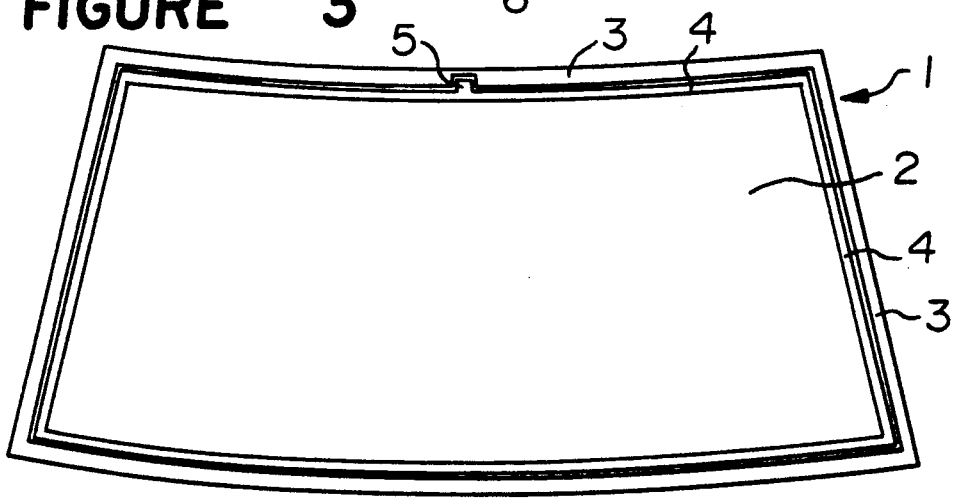
FIG. 3 is a third embodiment of the glass antenna of the present invention.
Figure 4:
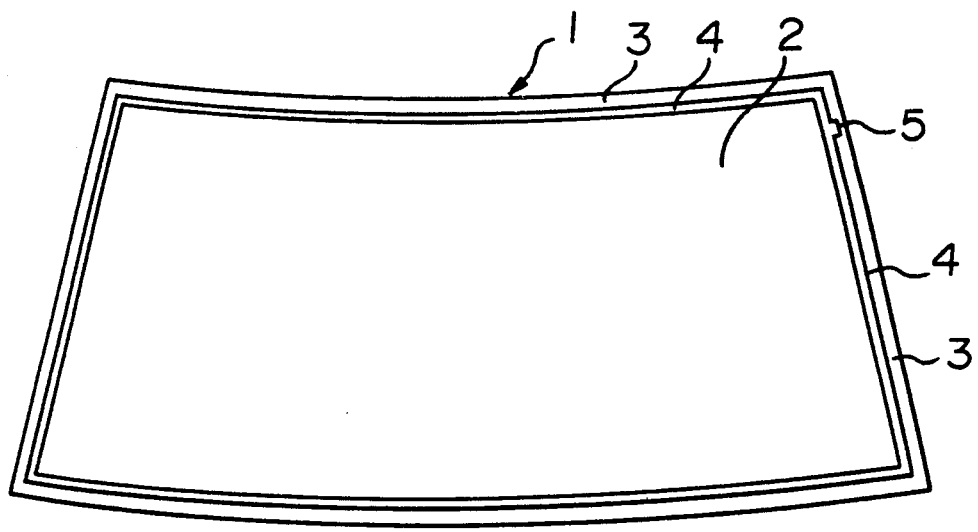
FIG. 4 is a fourth embodiment of the present invention.
Figure 5:
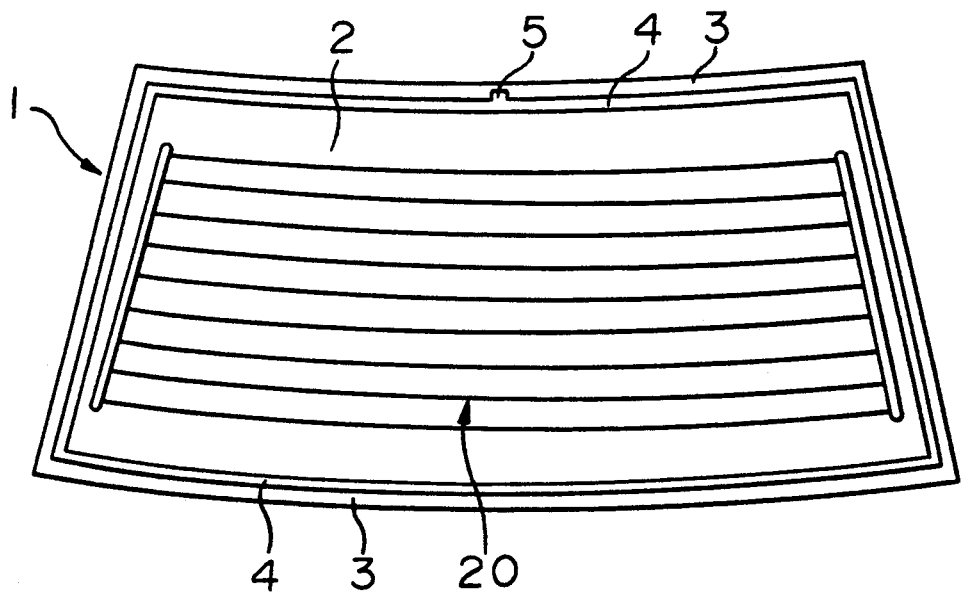
FIG. 5 is a fifth embodiment of the present invention.

A bus bar 4 is disposed at the peripheral portion of the transparent conductive film 2 along its entire circumference to gather a voltage induced in the film surface of the transparent conductive film 2. To obtain excellent performance as an antenna, it is desirable that the bus bar 4 surrounds the entire circumference of the transparent conductive film 2 in a closed loop as shown in FIGS. 1, 3, 4 and 5. FIG. 1 is an embodiment of the glass antenna of the present invention in which the bus bar 4 is formed along the peripheral portion of the transparent conductive film 2 and a current feeding terminal 5 is provided at the central portion of the lower side of the glass panel 1; FIGS. 3 and 5 show another embodiment which is identical with the embodiment shown in FIG. 1 except that the current feeding terminal 5 is provided at the central portion of the upper side of the glass panel 1; FIG. 4 shows another embodiment in which the current feeding terminal is provided at one side of the glass panel 1. However, the glass antenna of the present invention may have a pattern as shown in FIG. 2 that the upper and lower central portions of the bus bar surrounding the entire peripheral portion of the transparent conductive film 2 are divided into two portions of a substantially ⊐-like shape which are symmetric with respect to the vertical center line passing through the glass panel 1. Further, it is possible to use a pattern that two substantially ⊐-shaped bus bars face in an asymmetric manner, or a pattern that two L-shaped bus bars face with respect to a diagonal line of a rectangular transparent conductive film 2. Briefly, a desired pattern can be selected in consideration of a required performance of antenna as far as the bus bar 4 surrounds the substantially entire peripheral portion of the transparent conductive film 2. The width of the bus bar 4 formed by a printing method is preferably at least 1 mm, more preferably 10 mm or more. However, the upper limit of the width of the bus bar is preferably 30 mm or smaller, more preferably in the range of 3–20 mm from the viewpoint of design.

The bus bar 4 arranged as mentioned above may be formed by printing, on either the surface of the glass panel 1 or the transparent conductive film 2, a conductive paste which is obtained by mixing for suspension a conductive metallic powder such as silver, glass frit and vehicle having a low melting point, and a desired component if necessary, followed by baking it, or by printing a coating composition of a conductive reginous material, or by bonding a conductive foil such as an aluminum or copper foil.

The position of the current feeding terminal 5 to connect the antenna feeder line 6 from the bus bar 4 is preferably determined to be the central portion of the lower side of the bus bar 4 as illustrated in the drawings when various circumstances such as the regulation in the automobile industry, and a positional relationship for various communicating devices to which the current feeding terminal 5 is connected through the antenna feeder line 6, are considered. A large degree of freedom to determine the position of the current feeding terminal 5 for the antenna feeder line 6 is obtainable since the bus bar is arranged along the substantially entire peripheral portion of the transparent conductive film 2. For instance, the current feeding terminal 5 may be located at a suitable position in the upper side of the bus bar 4 to improve the sensitivity of the antenna.

Figure 6:
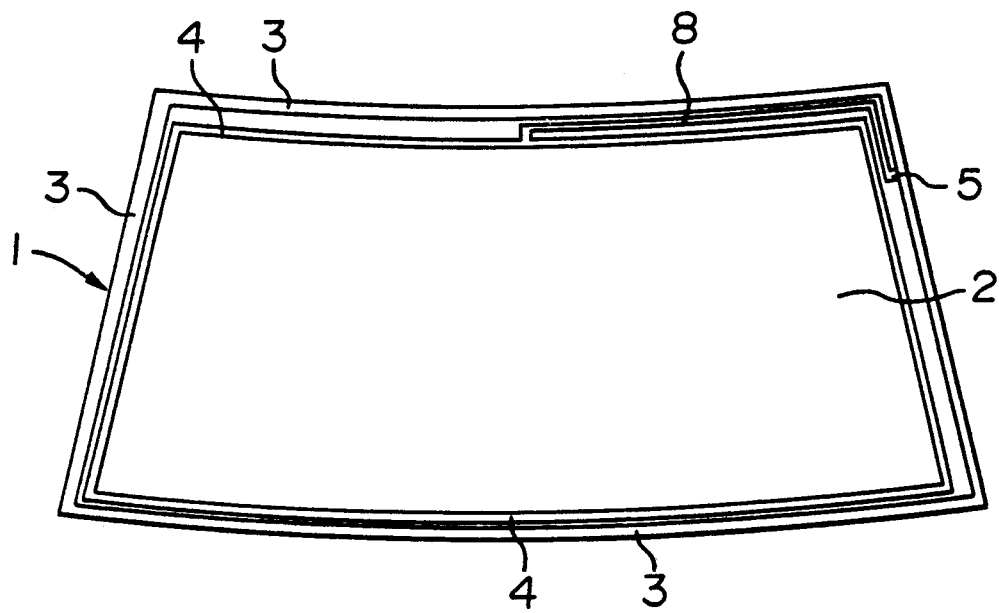
FIG. 6 is a sixth embodiment of the present invention.

When the current feeding terminal 5 is placed in the upper or lower side of the window glass panel 1, it is desirable that the position of the terminal 5 is within ±100 mm at the central portion of the glass panel from the viewpoint of the sensitivity of the antenna and the appearance of the glass panel. When the current feeding terminal 5 is positioned in either side portion of the panel 1, it is preferable to determine the, position within 0–200 mm from the upper corner portion, more preferably within 50–100 mm from the viewpoint of the sensitivity of the antenna and the appearance. As shown in FIG. 6, it is possible that a bus bar 8 is branched from a part of the bus bar 4 to extend it in the blank region 3 surrounding the transparent conductive film 2 in the window glass panel 1 so that the current feeding terminal 5 is formed at a desired position at a suitable peripheral portion in the window glass panel 1.

In the laminated glass including the antenna conductor of the present invention, an electric heater 20 may be provided in the inner face of the inner glass plate of the laminated glass for the purpose of imparting anti-fogging function to the glass panel as shown in FIG. 5. The electric heater 20 may be formed by printing an electroconductive paste containing silver, glass frit, vehicle and a desired component on the glass panel to form a plurality of printed lines having current conductivity, followed by baking them, or by forming a transparent current conducting layer on the glass panel or by arranging a current conductive wire on interlayer film of laminated glass.

Figure 7:
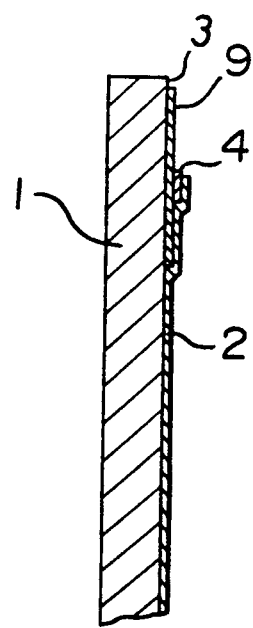
FIG. 7 is a longitudinal cross-sectional view of the glass antenna according to the present invention.
Figure 8:
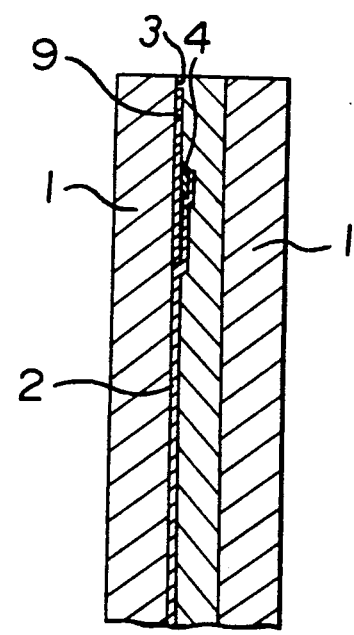
FIG. 8 is a longitudinal cross-sectional view partly broken of a modified embodiment of the present invention in which the glass panel is formed by a laminated glass.

Further, in the present invention, a colored coating layer may be formed at the peripheral portion of the outer glass plate, or the inner glass plate, or the both of them of the laminated glass so that the border line of the stripe-like bus bar or the blank region of the transparent conductive layer is not conspicuous from the interior or the exterior of the automobile. Thus, by concealing the border line, the appearance of the glass panel becomes excellent. For instance, a colored coating layer 9 is formed at the peripheral edge portion of the window glass plate 1; the bus bar 4 is formed in a part of the colored coating layer 9, and the transparent conductive film 2 is formed covering the bus bar 4 as shown in FIGS. 7 and 8. Alternatively, a first colored coating layer is formed at the peripheral edge portion of the outer glass plate of a laminated glass; a stripe-like bus bar is formed on the colored coating layer so as to cover a part of it, and a second colored coating layer is formed at the peripheral edge portion of the inner glass plate of the laminated glass for the purpose of concealment. Otherwise, the colored coating layer may be formed at the peripheral edge portion of the outer surface of the outer glass plate to conceal the stripe-like bus bar, or it is formed at the peripheral edge portion of the outer surface of the inner glass plate to conceal the stripe-like bus bar.

The width of the colored coating layer is suitably determined depending on the width of the bus bar. Namely, if the bus bar is too much exposed, it becomes conspicuous. Accordingly, the colored coating layer is preferably formed to cover the substantial portion of the bus bar.

The colored coating layer is formed by a material which forms an opaque coating layer capable of concealing the bus bar when it is applied to the glass panel. For instance, the colored coated layer is formed by applying, at a predetermined thickness and width on the glass panel, a colored ceramic frit coating composition in a paste form which includes a pigment having a dark color tone, glass frit, a vehicle and requisite additives, or an organic coating composition including a pigment having a dark color tone, an organic resin and requisite additives by means of printing, followed by baking or curing.

Figure 9:
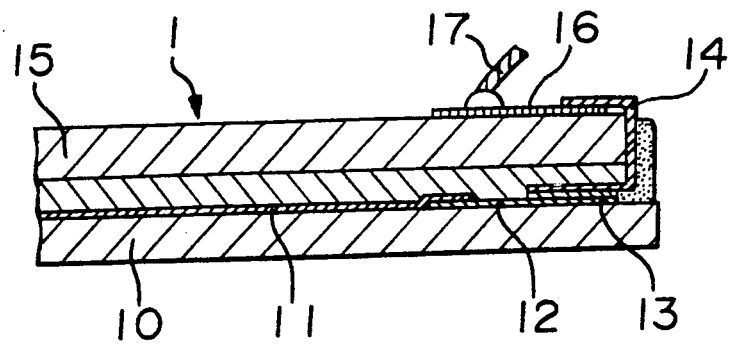
FIG. 9 is a transverse cross-sectional view of an embodiment of a current feeding part for the glass antenna of the present invention.

FIG. 9 shows an example of the construction of a antenna lead wire connecting portion in a transparent glass antenna in a laminated glass. In the embodiment shown in FIG. 9, a transparent conductive film 11 is provided on the outer glass plate 10; a bus bar 12 is placed on the outer glass plate 10 so that a portion of the bus bar 12 is overlapped with the film 11; a terminal plate 14 made of a conductive metal such as copper or phosphor bronze is connected to the current feeding terminal 13 of the bus bar 12; the free end of the terminal plate 14 is bent inwardly so that the inwardly bent portion of the terminal plate 14 is connected to a terminal 16 fixed to a predetermined portion in the inner glass plate 15, and an antenna feeder line 17 is connected to the terminal 16.

In the present invention, a transparent infrared reflecting layer or a transparent conductive layer functioning as a heater to melt ice or snow and to impart anti-fogging function may be provided on the side of inner glass plate where the film-like antenna conductor is not formed, the bonding surface of the outer glass plate or the outer surface of the outer glass plate.

The following experiments were conducted to confirm the performance of the glass antenna having the above-mentioned construction of the present invention. An induced voltage of the glass antenna having the pattern as shown in FIG. 1 was measured in electric fields wherein the induced voltage of the dipole antenna is 60 dBμ. As a result, the following values were obtained.

| f (MHz) | 76 | 78 | 80 | 82 |
| --- | --- | --- | --- | --- |
| Performance (dBμ) | 43.6 | 44.4 | 42.9 | 39.9 |
| f (MHz) | 84 | 86 | 88 | 90 |
| Performance (dBμ) | 41.7 | 42.2 | 40.1 | 37.7 |

Figure 10:
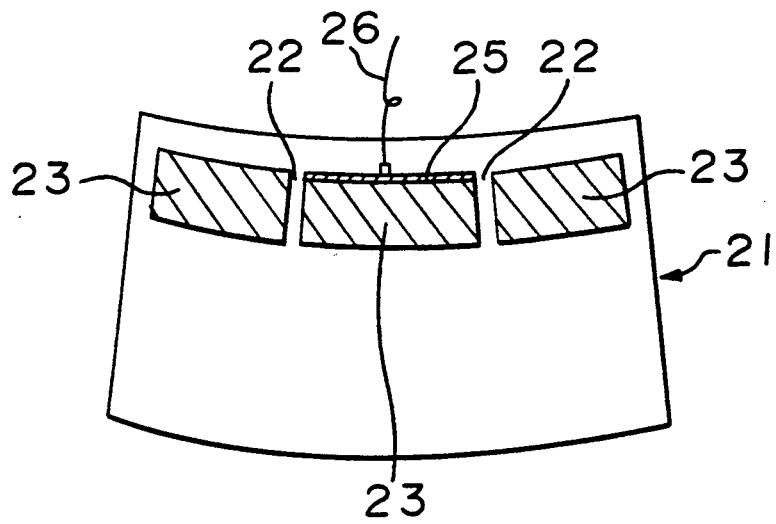
FIG. 10 is a front view of a glass antenna developed by the inventors of the present application.

In view of the above-described Table, the average value in the frequency bands is 41.6 dBμ. Thus, it was confirmed that the embodiment shown in FIG. 1 is more advantageous than the conventional glass antenna. Namely, in accordance with the present invention, it is possible to obtain values higher than those obtained by the conventional glass antenna as shown in FIG. 10 which performance is 40 dBμ.

Thus, in the present invention, an electromotive force can be effectively obtained by arranging the bus bar so as to surround the entire or the substantially entire peripheral portion of the transparent conductive film.

Further, the position of the current feeding terminal can be determined at a desired location in the bus bar.

Further, by adjusting the width of the insulating region 3 formed at the outer circumferential portion of the transparent conductive film, there is obtainable the performance of the antenna which is effective to a specific frequency band. The insulating region also minimizes loss in an induced electromotive force which tends to discharge from the transparent conductive film as an antenna conductor toward the car body, whereby desired antenna gain can be obtained.

In the present invention, the bus bar formed to surround the entire or the substantially entire peripheral portion of the transparent conductive film does not constitute an obstacle to the visual field of a driver; does not disturb the driver unlike a conventional printed antenna; improves performance as an antenna; shows a remarkable improvement in work; imparts some degree of freedom in determination of the position for drawing the antenna feeder line.

In addition, by utilizing an infrared reflecting transparent conductive film on the substantially entire surface of the window glass panel, there is attainable an associated function of a low radiation for a passenger in the cabin of an automobile, reducing a load for a car-mounted air conditioner, and controlling temperature rise in the cabin due to solar heat.

Obviously, numerous modifications and variations of the present invention are possible in light of the above teachings. It is therefore to be understood that within the scope of the appended claims, the invention may be practiced otherwise than as specifically described herein.

We claim:

1. A transparent antenna for an automobile, comprising:
    a window glass panel;
    an infrared reflecting transparent conductive film integrally formed with said window glass panel;
    said transparent conductive film covering said window glass panel except for a blank region of glass having a predetermined width of at least 10 mm around the periphery of said window glass panel, the transparent conductive film having a surface resistance ranging from $4\Omega/\square$ to $500\Omega/\square$;
    a busbar formed on said window glass panel around said transparent conductive film and connected to said transparent conductive film at substantially the entire periphery of said transparent conductive film; and
    a current feeding terminal connected to said busbar;
    wherein said window glass panel is a laminated glass panel formed by laminating at least two glass plates between which an interlayer film is placed, and said transparent conductive film is provided on the inner surface of one of said glass plates facing the outside of an automobile so as to be in contact with said interlayer film.

2. The transparent antenna according to claim 1 wherein the width of said bus bar which surrounds the substantially entire peripheral portion of said transparent conductive film is at least 3 mm.

3. The transparent antenna according to claim 1, wherein said busbar is formed of two sections each having two ends, with one end of each being connected to said terminal, each of said sections extend almost half of the periphery of said transparent conductive film, the remaining ends of said sections being separated from each other by a distance.

* * * * *